United States Patent [19]

Nilsson

[11] Patent Number: 4,945,950

[45] Date of Patent: Aug. 7, 1990

[54] CONTINUOUS TAPPING DEVICE

[75] Inventor: Lars A. H. Nilsson, Oskarshamn, Sweden

[73] Assignee: Astra Meditec AB, Molndal, Sweden

[21] Appl. No.: 358,368

[22] PCT Filed: Nov. 11, 1987

[86] PCT No.: PCT/SE87/00526

§ 371 Date: Jun. 14, 1989

§ 102(e) Date: Jun. 14, 1989

[87] PCT Pub. No.: WO88/03626

PCT Pub. Date: May 19, 1988

[30] Foreign Application Priority Data

Nov. 13, 1986 [SE] Sweden ............... 86048550

[51] Int. Cl.$^5$ .................................. F16L 27/00
[52] U.S. Cl. .................... 137/798; 137/317; 137/580; 251/146
[58] Field of Search ............... 137/317, 580, 798; 251/146

[56] References Cited

U.S. PATENT DOCUMENTS

| | | | |
|---|---|---|---|
| 3,580,401 | 5/1971 | Stahl | 137/580 X |
| 3,620,250 | 11/1971 | Wieck | 137/580 X |
| 3,643,867 | 2/1972 | Thietje | 137/580 X |
| 3,814,130 | 6/1974 | Allen et al. | 137/580 |
| 3,913,470 | 10/1975 | Cullen | 137/580 X |
| 4,117,773 | 10/1978 | Johnson | 137/580 X |

FOREIGN PATENT DOCUMENTS

| | | |
|---|---|---|
| 2114186 | 9/1972 | Fed. Rep. of Germany . |
| 3346111 | 10/1984 | Fed. Rep. of Germany . |
| 397720 | 11/1977 | Sweden . |
| 569224 | 11/1975 | Switzerland . |
| 1090396 | 11/1967 | United Kingdom . |

Primary Examiner—Gerald A. Michalsky
Attorney, Agent, or Firm—Ladas & Parry

[57] ABSTRACT

A continuous output device for liquid or gaseous fluids comprising a rail having channels each opening to a first surface of the rail through a slit sealed by a sealing strip, the fluid being supplied to the channels of the rail, and a coupling having an opening member for locally pushing aside the sealing strip for passing, at activation of the coupling, the fluid to said coupling beyond the sealing strip for further distribution to a using place. The sealing strip comprises a spiral spring covered with a sealing body for sealing against the slit. The revolutions of the spiral spring are inclined so that the torsional properties of the spring are used for pushing aside the sealing strip.

8 Claims, 13 Drawing Sheets

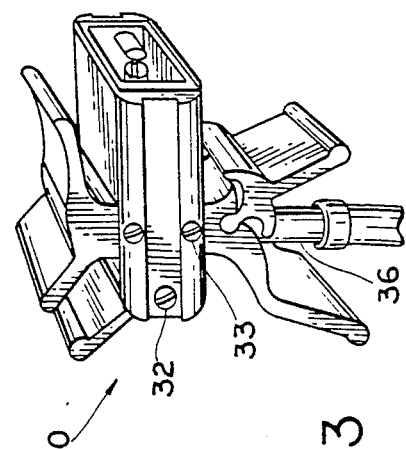
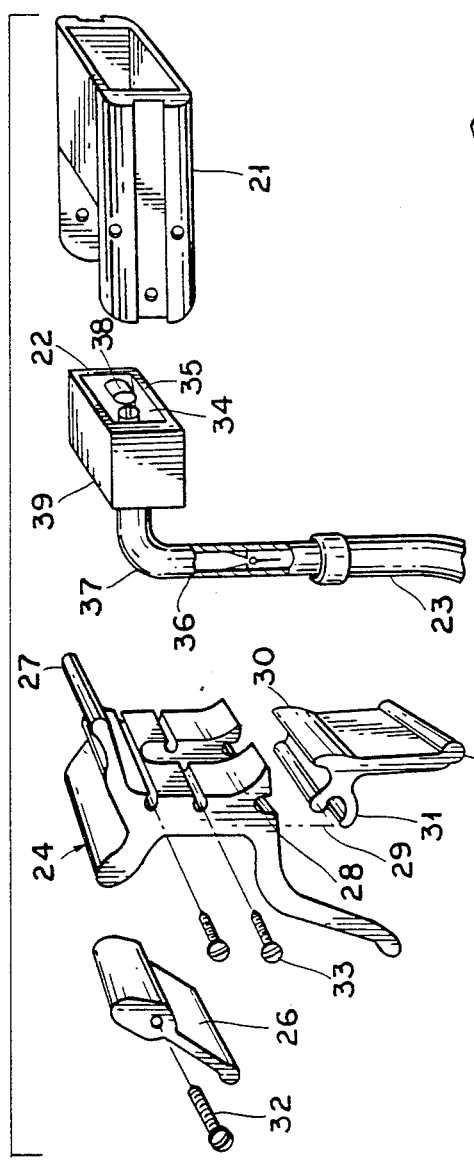

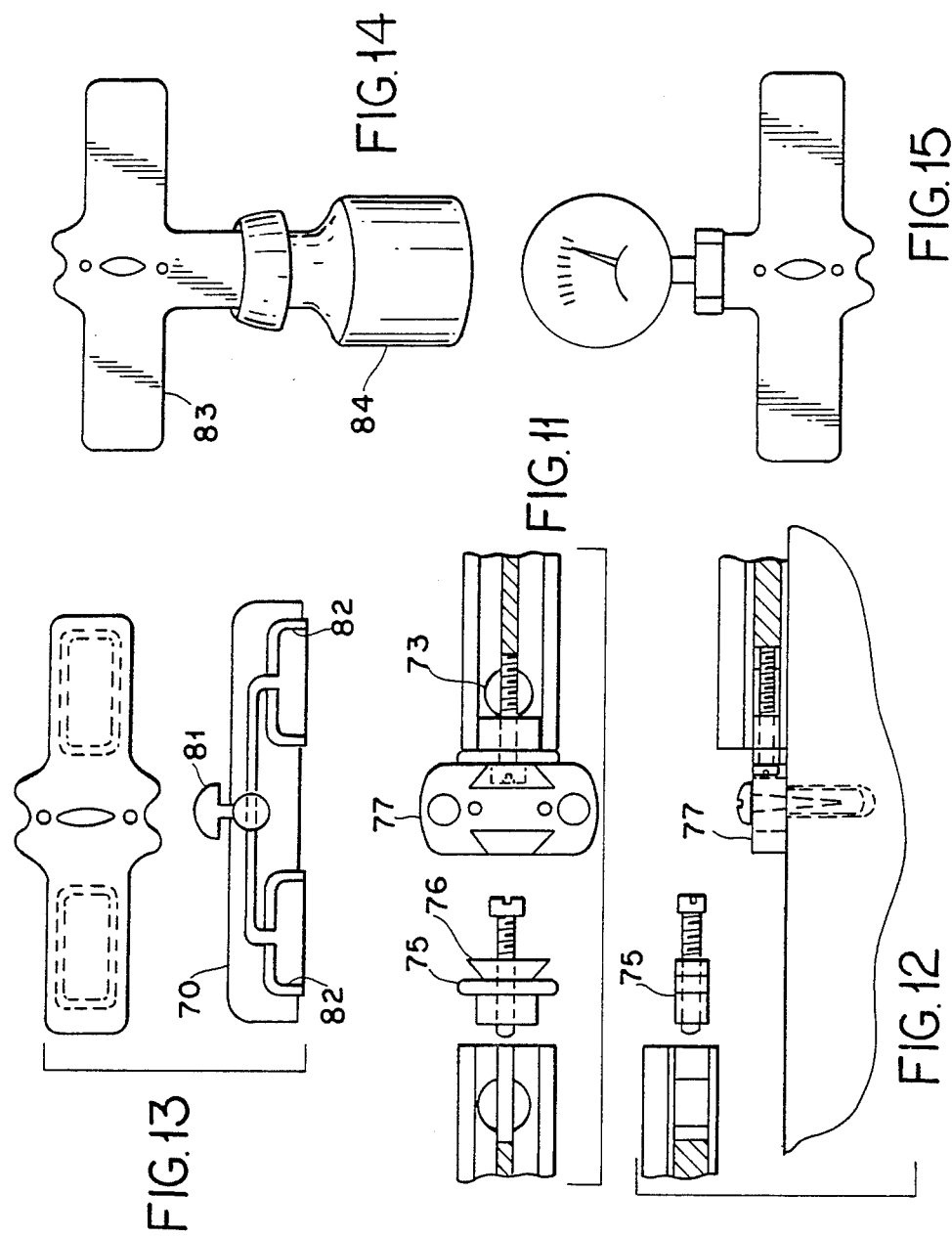

CONTINUOUS TAPPING DEVICE

FIELD OF INVENTION

The present invention relates to a continuous output device for a liquid or gaseous fluid.

PRIOR ART

An output device comprising a rail with a slit therein intended to contain and conduct a fluid is previously known from e.g. U.S. Pat. No. 3,913,470. The slit opens to the outer surface of the rail and is sealed by a sealing strip. A coupling is positioned on the rail at an optional position along the rail. The coupling pushes aside a part of the sealing so that the fluid can pass out to the coupling and thence to a hose connected to the coupling for distribution to the intended apparatus.

In the Swedish patent specification No. 7700757-3 there is disclosed an output device for a fluid, in which the coupling is continuously moveable along the rail. However, the coupling is not removable from the rail but only moveable along said rail. A sealing strip for a slit is pushed aside by a semicircular member. Two sealing rollers on either side of said member ensure that the sealing strip is pushed against the slit on either side of the coupling.

U.S. Pat. No. 4,117,773, discloses an output device for fresh air, in which a coupling is moveable along a tube. Also at said output device, it is impossible to attach the coupling removably at optional positions along the tube or attaching several couplings along the tube. A slit along the tube is provided with a sealing strip, which can have different constructions according to said patent specification. The sealing strip can be of stainless steel provided with an insulating lining or a protection cover of glass fibres. The strip can be divided in several sections, e.g. three meters long and interconnected by a sealing. The elasticity of the strip entails that it springs into abutment with the rims of the slit at either side of the coupling.

DISCLOSURE OF THE INVENTION

The object of the present invention is to provide an output device having the possibility to place several couplings continuously along a rail.

Another object of the present invention is to provide an output device having a practical and useful coupling.

Still another object of this invention is to provide an output device specifically suitable to be used at the distribution of gases at a hospital.

Another object of the present invention is to provide a sealing band or sealing strip for such an output device, in which the sealing strip offers a safer spring-back of the strip at either side of an output.

Furthermore, it is an object of the present invention to provide a bridgement device for such a rail, which is easy and reliable to use.

Thus, there is provided a continuous output device for a liquid or gaseous fluid, comprising a rail having at least one channel opening to a first surface of the rail through a slit which is sealed with a sealing strip, whereby the fluid is adapted to be supplied to the slit of the rail through a suitable connection, and a coupling comprising an opening member for locally pushing aside the sealing strip so that the fluid can pass to the coupling beyond the sealing strip for further distribution to a using place.

According to the invention, the coupling comprises a cover; a rubber sleeve positioned in said cover and adapted to seal against the bottom of the slit; an engagement member for engaging and locking the coupling to the rail; and an activation member for moving said opening member to cooperation with and pushing aside said sealing strip in the slit.

The rail may comprise several parallel channels for distribution of different gases or liquids. Said channels can be accessed by the same coupling.

Preferably, the sealing strip comprises a spiral spring provided with a sealing material for sealing against the slit. Suitably, the spiral spring have revolutions forming an acute angle with the longitudinal axis of the spring.

The sealing strip can be adapted to fit loosely in a main part of said channel of the rail and the channel may further comprise a side part adapted to house a biasing member adapted to bias the sealing strip, after the insertion in the side part, towards the slit with a predetermined biasing force.

Preferably, the sealing material is a sealing body having six or eight corners.

The output device may comprise a tube having a gently rounded end adapted to cooperate with the sealing strip and to locally push it aside for outputting the fluid at the activation of a lever arm. Preferably, the output device is said cover comprising a sealing border around the rims thereof for sealing against the rail around the output position, whereby the tube comprises an enlargement adapted to press the sealing border against the rail so that the sealing border will have a flatted shape for forming a large abutment surface.

A lengthening member may be adapted for connection of two rails comprising a connection member having a conical opening adapted to be connected to each rail and a bridgement member provided with two conical tips facing in opposite directions and being connected to each other via a boring and being intended to cooperate with said conical openings in two rails positioned at either side of said bridgement member.

SHORT DESCRIPTION OF THE DRAWINGS

The invention is described below in more details by means of preferred embodiments of the invention and with reference to the appended drawings.

Thus, FIG. 1 is a perspective view of an output rail according to the present invention.

FIG. 2 is an exploded view in perspective of a coupling according to FIG. 1.

FIG. 3 is a perspective view of the assembled coupling.

FIGS. 11–15 are side views showing the series connection of several rails by means of different units.

DETAILED DESCRIPTION OF THE INVENTION

Figure 1:
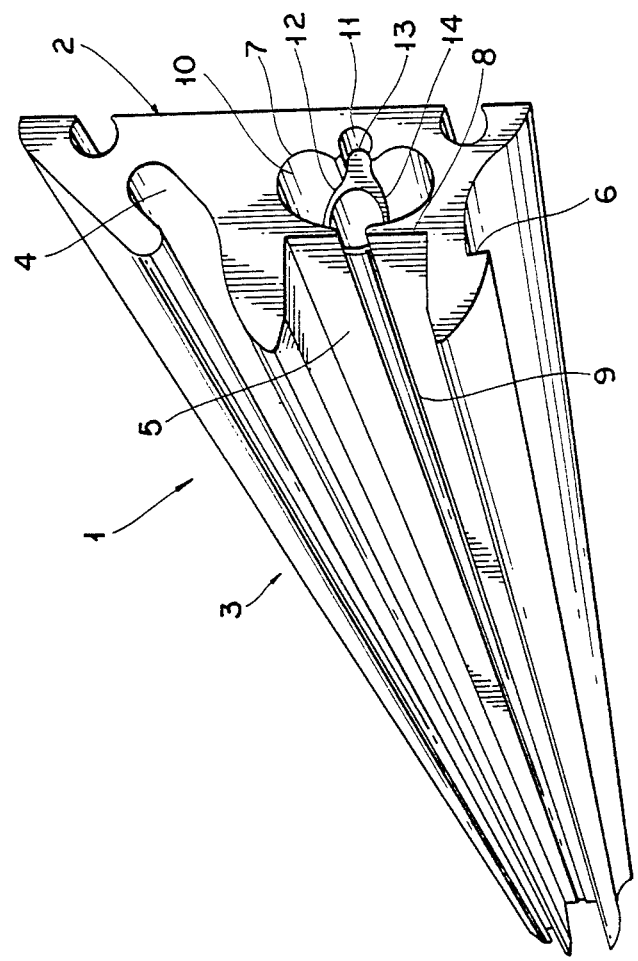

FIG. 1 shows an output rail according to the invention. The rail 1 is intended to be mounted on a wall etc by means of screw holes, not shown.

Rail 1 comprises a back side 2 intended to abut the wall or a foundation, and a front side 3. The front side is, at its upper end, provided with a recess 4 having the shape shown in FIG. 1. A second recess 5 having essentially rectangular cross-section is positioned at the middle of the front side. At the bottom side of the rail 1, there is a hook-like edge 6, the operation of which is described later. At the middle recess 5, there is a slit or channel 7 opening the bottom 8 of the middle recess by means of a narrow slit 9.

Channel 7 is provided with two lobes 10 extending upward and downward, and a lobe 11 extending inward. A sealing member in the nature of an extended rubber strip 12 is positioned in the channel 7 as shown in FIG. 1. The rubber strip is shaped as a distorted figure eight having an inner portion 13 of homogeneous rubber positioned in the inner lobe 11 of the channel and an outer portion 14 having hollow cross-section and extending to the slit 9 of channel 7. By means of the elastic properties of the rubber material, the outer portion 14 will always be pressed by the rubber strip against the slit for sealing the slit.

The lobes 10 and 11 are connected to a gas source, such as a compressed air supply, comprising a gas or liquid intended to be distributed. The gas presses against the outer surface of the rubber strip 12 inside the lobes, which entails that the outer portion 14 tends to have a still more elongated shape, whereby said portion is pressed still closer against the slit 9 for further sealing it. It is mentioned that the rubber strip is pressed against the slit by its own force and elasticity for sealing it.

The rubber material is of such a quality that the rubber strip always maintains a reliable sealing against the slit. The slit can be somewhat conical for further ensuring that a reliable sealing is achieved.

The rail is constructed for cooperation with a so called vice shown in FIGS. 2 and 3. FIG. 2 shows the vice 20 in an exploded view. The vice comprises an outer cover 21, an inner rubber sleeve 22 positioned in a metal cap 39 and having a connection hose 23, an engagement member 24, a locking member 25 and an activation member 26. The different members are assembled as shown in FIG. 3 by screws and shaft pins. The engagement member 24 is provided with an upper engagement element 27 shaped to fit in a recess 4 in the rail. The locking member 25 is pivotably fit in a slit 28 in the engagement member 24 as shown by a line 29. The locking member 25 is provided with a shoulder 30 adapted to cooperate with the edge 6 of the rail 1 as described closer below. Moreover, the engagement member 25 comprises a stop shoulder 31, the operation or which is described with reference to FIG. 3. The activation member 26 pivotably cooperates with the sleeve 21 via two screws 32, one of which is shown in FIGS. 2 and 3. The engagement member 24 is attached to the sleeve 21 by four screws 33.

The hose 23 is attached to a nipple 36 which is vulcanized to the rubber sleeve 22 in the embodiment shown in FIG. 2. The rubber sleeve 22 is enclosed in said metal cover 39 and is essentially rectangular and has one of its ends open. Said opening 34 is provided with borders 35 for sealing against the bottom 8 of the rail as described below.

The other side of the rubber sleeve 22 is sealed against the nipple 36 so that an air-tight space is formed inside the rubber sleeve.

The hose 23 is provided with the nipple 36 which can be a metal tube bent in an angle 37 of 90° and opening to the rubber sleeve 22. The metal tube 36 extends inside the interior of said rubber sleeve and is ended by a gas opening 38 positioned in the same plane as the opening 34. The hose 23 is eventually connected to the equipment to be used, which can be an oxygen apparatus etc. Preferably, the metal tube 36 comprises an one-way for preventing back-flow of the compressed air or other gas at the disconnection of the vice. In FIG. 2 a one-way valve is suggested in the metal tube 36.

The vice is attached to the rail according to FIG. 1 in a manner known per se by hooking the engagement member 27 into the corresponding recess 4 of the rail 1 and then pivoting the vice downward-inward until the shoulder 30 engages the edge 6 and hooks the vice to the rail. The cover 21 is dimensioned so that it fits inside the middle recess 5 of the rail. The border 35 of the rubber sleeve 22 positioned in the outer cover 21 of the metal cover 39 will abut the bottom 8 of the middle recess 5 of the rail 1 and form a closed space together with said bottom. At its lower border 35, the rubber sleeve is bent somewhat outwards to a dome-shaped form. Said construction entails that a over-pressure inside the rubber sleeve forces the border outward resulting in that the border 35 of the rubber sleeve is pressed against the rail.

Figure 4:
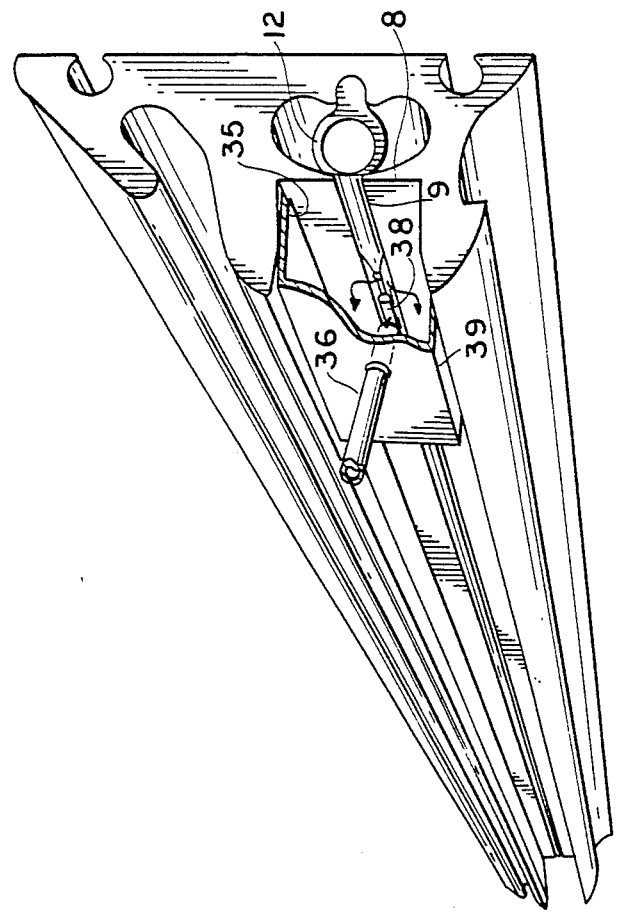
FIG. 4 is a perspective view showing the coupling attached to the rail according to FIG. 1.

FIG. 4 shows the rubber sleeve and its abutment against the bottom 8. When it is desired that the gas in the channel 7 shall flow out in the closed space of the rubber sleeve 22, the metal tube 36 is pressed against the rail 1 by pivoting the activation member to the upper position shown in FIG. 3. Then, the enlarged portion of the activation member 26 will push the tube 36 and move it inward. Since the back wall of the rubber sleeve is elastic, said movement of the tube 36 results in that the gas opener 38 is moved inward toward the rail so that the gas opener will arrive to abutment against the rubber strip 12 in the slit 9 of the rail and push it a short distance inwards. Thence, the sealing between the rubber strip 12 and the slit 9 ceases and the gas flows out from the channel 7 into the rubber sleeve and to the metal tube 36 and the hose 23 and to the user (not shown). At the same time, the border of the rubber sleeve is pressed firmly against the bottom of the rail so that a reliable seal against said bottom is obtained.

When the space in the rubber sleeve 22 is filled with compressed air or gas, the pressure in the sleeve will act upon the rubber strip 12 beside the place in which the gas opener engages the rubber strip. However, the rubber strip will maintain a reliable seal merely a short distance beside the engagement place, since the rubber strip has an interior elasticity pressing it against the inside of the slit 9. Thus, the rubber sleeve 22 is dimensioned so that it has a sufficient extension in the longitudinal direction of the rail for covering the area of the slit not sealed by the rubber strip when it is opened by the gas opener 38.

In order to protect the rubber strip against wear from the gas opener, a steel strip can be positioned between the gas opener and the rubber strip. This construction can be obtained in many ways, e.g. by vulcanizing a spring steel on the front side of the rubber strip or placing the spring steel in slots of the rubber strip. Furthermore, the slit in the rail may comprise a spring steel, whereby the rubber strip abuts the spring steel from behind. The sealing can take place against an adjacent area of the slit of the rail. At the opening by the gas opener, it acts upon the spring steel which in turn acts upon the rubber strip over a large area and moves aside the strip as described above.

From FIG. 3 it appears that the locking member 25 is provided with a stop shoulder 31. When the vice is adapted on the rail as described above, the activation member must be in the off-position. Then, the vice can be attached to the rail as mentioned above. However when the activation member 26 is move to the activated position, the tube 36 is moved at the same time to the right seen according to FIGS. 2 and 3. Then, the stop shoulder 31 will abut the tube 36 and prevent the locking member 25 from being pivoted to the opened position, i.e. clock-wise in FIG. 3. Thus, the vice will be locked to the rail and cannot be removed as long as the activation member is in the activated position. As soon as the activation member 26 is moved to the off-position, the tube 36 is moved to the left in FIG. 3 and the stop shoulder is released from the abutment against the tube 36 and the locking member 25 can be pivoted clock-wise to the released position and the vice can be removed from the rail. Thus, a security locking is obtained preventing removal of the vice when the gas is supplied, both intentionally and unintentionally.

It is appreciated that the metal tube can be terminated by a quick coupling of conventional type for cooperation with prevaling equipments already provided with such a quick coupling. Said quick coupling can be placed at the position where the hose 23 is connected to the tube 36 in FIG. 2 or 3.

Figure 5:
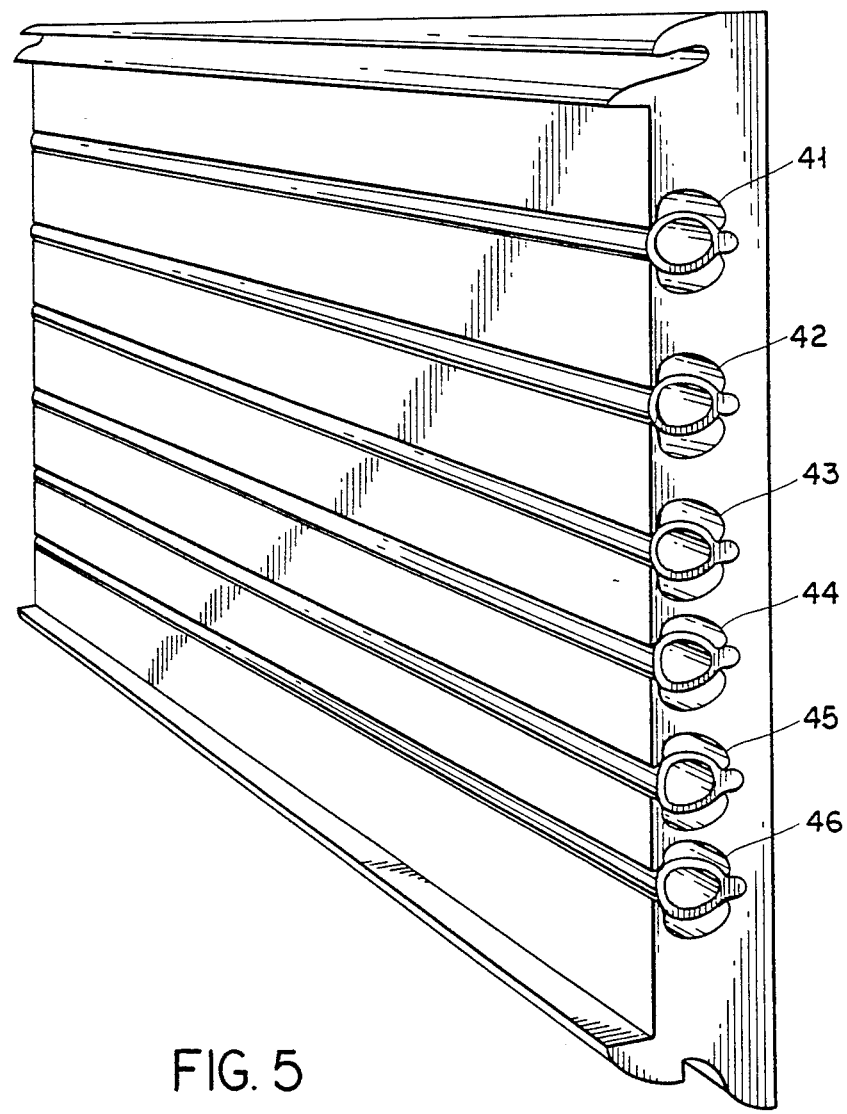
FIG. 5 is a perspective view showing a rail having several parallel channels for different types of gases or liquids.

FIG. 5 shows a second gas output rail according to the invention, said rail being provided with six parallel channels 41-46 of the same type as the channel 7 in FIG. 1. Other embodiments of the number and positions of the channels are of course possible in dependence of the intended application.

Figure 6:
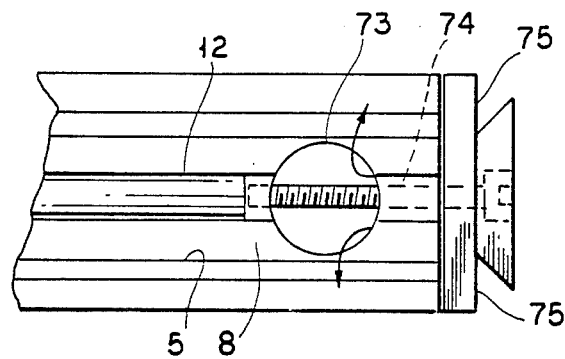
FIGS. 6–8 are perspective views of the lengthening of the rails.
Figure 7:
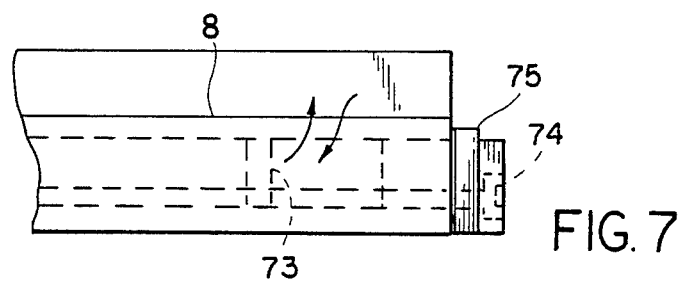

FIG. 6 shows a connection of the rail to an adjacent rail. In FIG. 6, the rail is provided with a hole 73 at the bottom 8 of the middle recess 5. The rubber strip is ended somewhat before said hole and is retained by a screw 74 adapted in an end piece 75.

FIGS. 13 and 14 show bridgement units which can be used for connecting two rails positioned in series. The bridgement unit 70 in FIG. 13 is provided with ball valves 81 for disconnection of the gas flow between the rails. Furthermore, there are two openings or recesses 82 which in the assembled position cover the hole 73 in the adjacent rails. By means of the ball valves 81 it is possible to insulate a separate rail in a row of rails without disconnection of the main supply of gas to a rail if that rail must be replaced or repaired.

FIG. 14 shows a bridgement unit 83 provided with a water separating filter 84. FIG. 15 shows a bridgement unit provided with a pressure unit. Other possibilities may be used in different applications.

Figure 8:
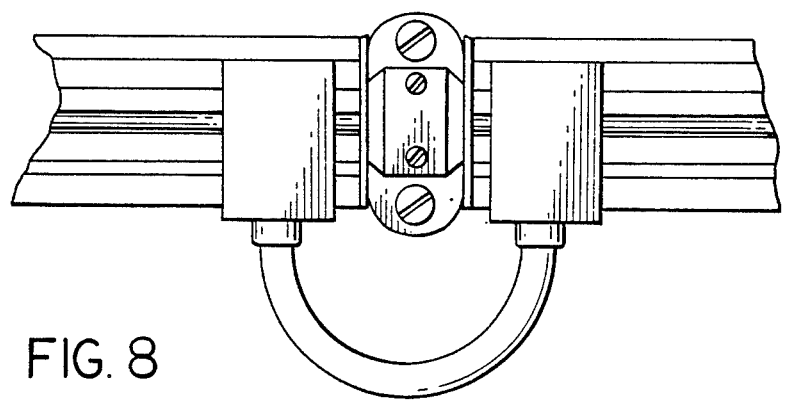

FIG. 8 shows that the bridgement can take place by means of two vices connected to each other.

FIG. 11 shows in more details the construction of the end portion 75. The end portion is provided with a dovetail slot 76 for cooperation with a mounting block 77 attached to the wall. FIG. 12 shows the same assembly in cross-section.

Figure 9:
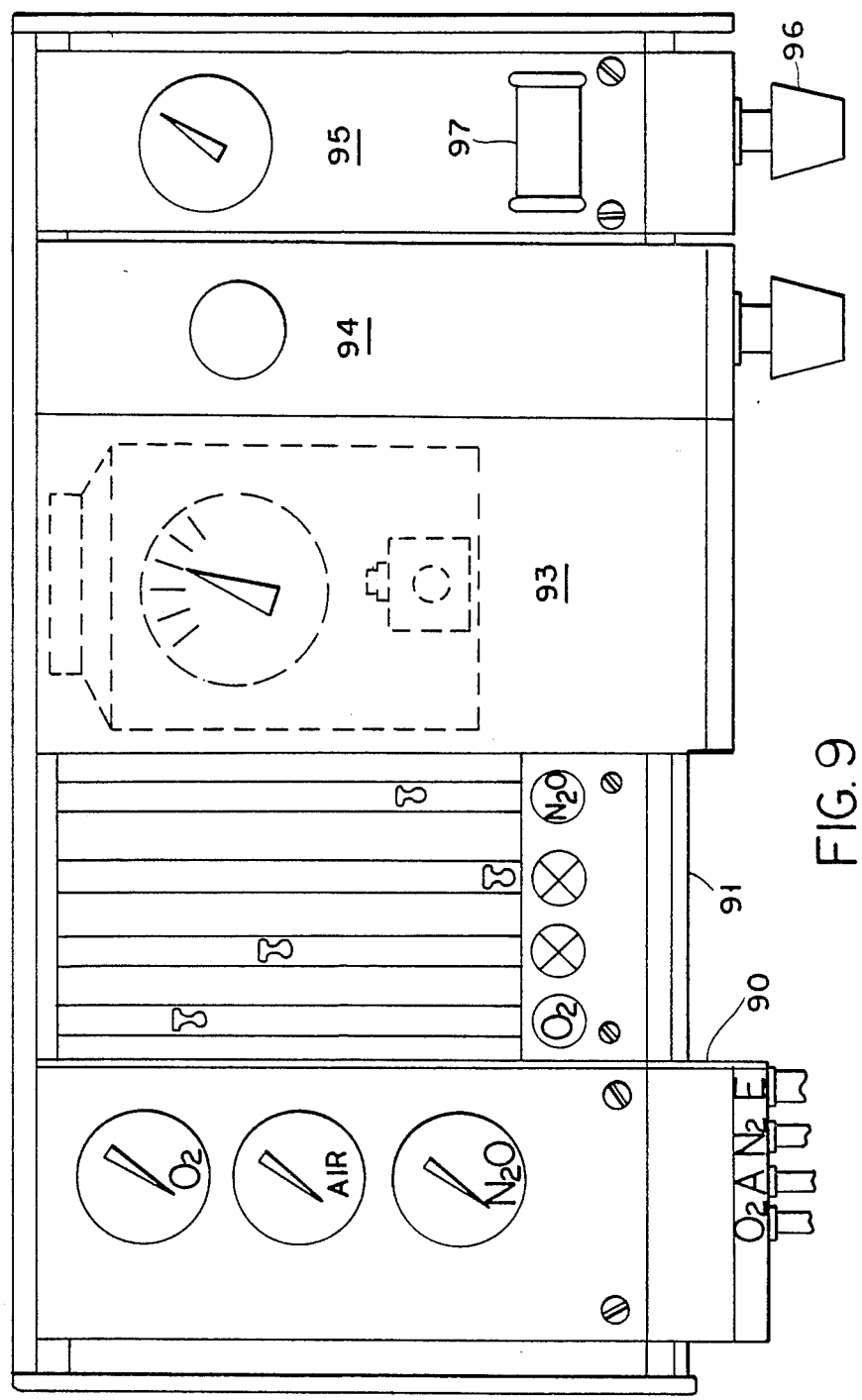
FIG. 9 is a plan view of a hospital application of the present invention.

FIG. 9 shows a plan view of an equipment which can be placed in an intensive care department of a hospital. The equipment is mounted along the rail of the type shown in FIG. 5 having six longitudinal channels 41-46. To the left in FIG. 9 there is shown a gas distribution portion 90 and then to the right a flow meter 91 having a gas mixer in a rotameter block. Thence follow an anaesthetic evaporator 93, an ejector 94 and a selector 95.

Figure 10:
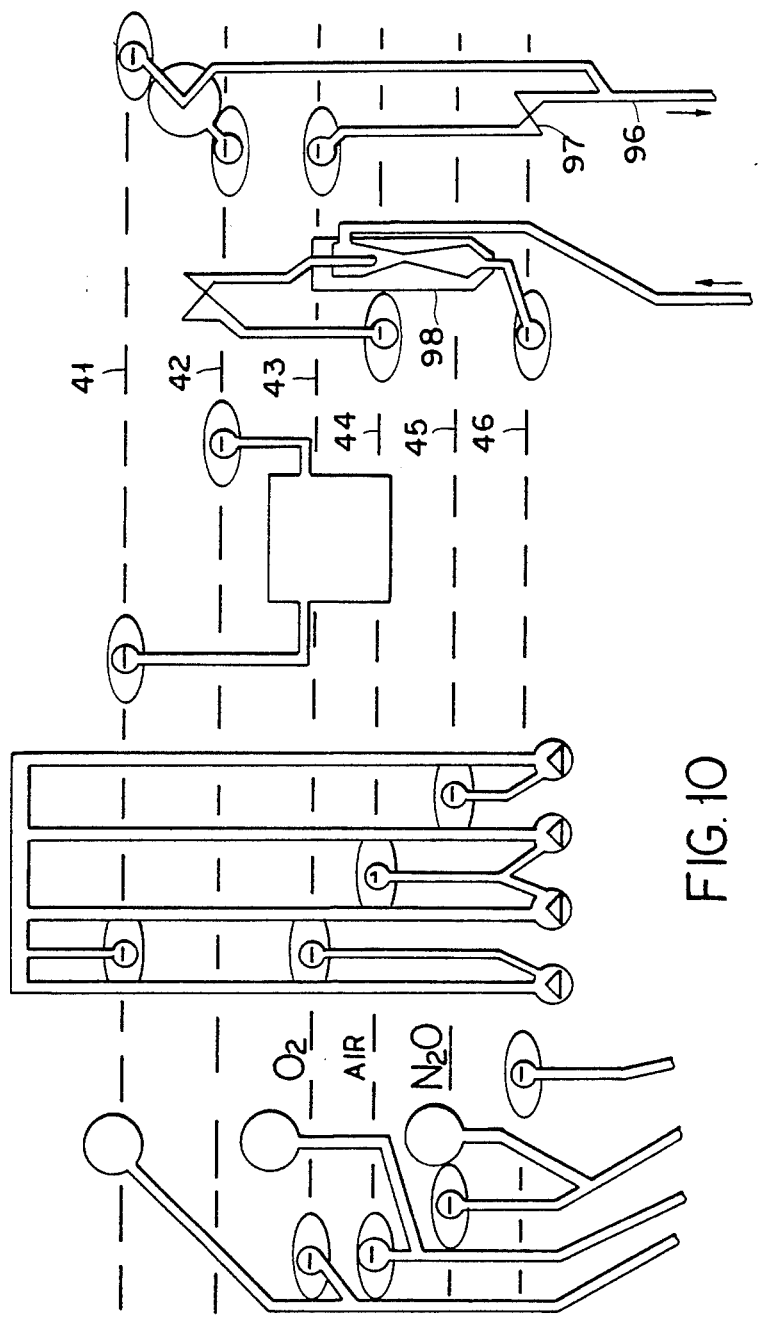
FIG. 10 is a schematic diagram showing the corresponding conduits and connections.

Said apparatuses are interconnected by a channel system positioned therebelow according to the invention as appears more closely from FIG. 10. The channels are shown as broken lines 41-46. The channels 43-46 are connected to sources for oxygen, compressed air, nitrous oxide and evacuation in said order.

The gas distribution portion 90 takes care of the supply and distribution of the gases and is provided with a gas distribution instrument for oxygen, air and nitrous oxide according to FIG. 9. In the flow meter 91, the gases are mixed in desired proportions and are fed via the channel 41 to the selector 95. If the selector is placed in the position shown, the gas distributed by the flow meter is connected to the patient via the conduit 96. Moreover, there is a oxygen valve 97 connecting oxygen directly to the patient in the opened position.

The return air from the patient is sucked via an ejector pump 98 to the evacuation channel 46. The ejector pump is driven by compressed air in channel 44. If the selector is positioned in the other position, channel 42 is connected to the output conduit 96. If i mixture of nitrous oxide and oxygen is fed to the conduit 41, said mixture will flow to the patient via the evaporator 93.

It is realized that the application shown in FIGS. 9 and 10 merely is an example of a possible application of the invention. However, the invention is universally applicable at all applications in which a flexible distribution of gases or liquids is desired.

It is realized that the invention can be modified in many respects within the scope of the inventive idea. Thus, the rubber strip 12 may very well be replaced by a plane rubber strip attached to the upper part of the slit and depending for covering the slit 9. In this case, the rubber strip can be biased inward so that a reliable seal always is obtained in the rest position. The strip can also be divided in short segments in the longitudinal direction and can be considerably stiffer or possibly be made of metal (possibly covered with plastics or rubber for the sealing). Further possibilities are evident for a skilled person.

Figure 16:
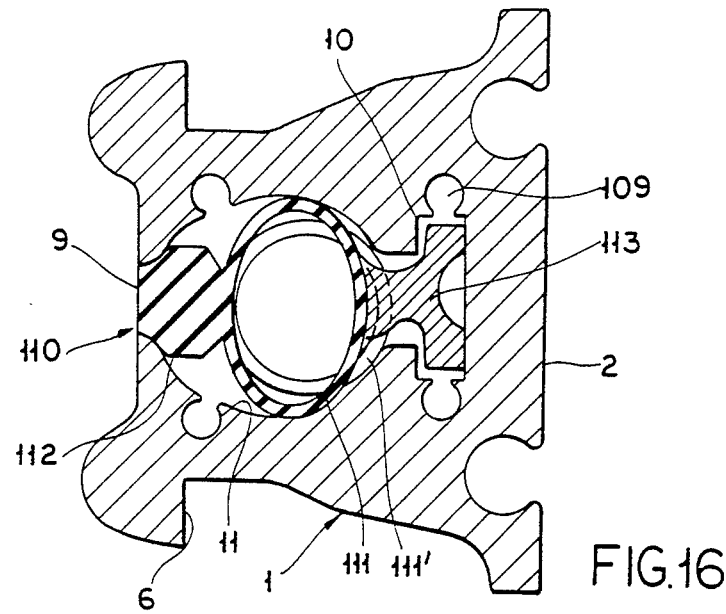
FIG. 16 is a cross-sectional view of a rail provided with a sealing strip according to the invention.

The rubber strip is formed, in a preferred embodiment, as shown in FIG. 16. The rubber strip 110 has the shape appearing from FIG. 16 and comprises a elongated portion 111 having circular cross-section and a sealing body 112 having six or eight corners. According to the invention, the elongated portion is a conventional spiral spring 114, cf. FIG. 18. The rail has a shape somewhat differing from that shown in FIG. 1 but has the same principal operation.

The spiral spring 114 and the body 112 is inserted in the circular main part 11 of the channel and can be inserted therein without any considerable friction, whereby the spiral spring 114 has an essentially circular shape as appears from the non-filled section 111' in FIG. 16. Then, the biasing member 113 is inserted in the side part 10 of the channel. The biasing member 113 extends a predetermined distance inside the circular main part 11 of the channel and presses the strip 110 outwards against the slit 9 so that the spiral spring 114 is deformed to an oval shape as shown by the filled section 111 in FIG. 16. Then, the sealing body 112 is biased against the slit 9 of the channel so that a reliable sealing always is assured. The sealing body has such a shape that it agrees with the inner shape of the channel and is somewhat keyed at the biasing outward.

The biasing member 113 can be adapted for deforming the spiral spring 114 in the desired extent and so that a suitable biasing pressure for the strip is achieved.

Figure 17:
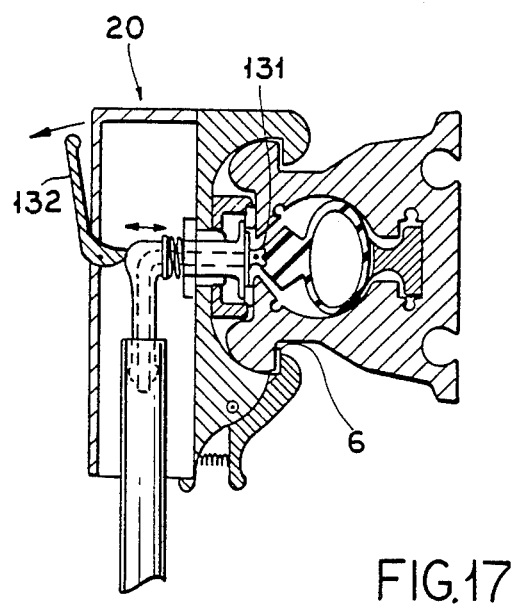
FIG. 17 is a cross-sectional view similar to FIG. 16 but having an coupling mounted so that it pushes aside the strip.

In FIG. 17 there is shown a cross-section from which appears the attachment of an coupling 20 of the same principal construction In FIG. 17 there is shown a cross-section from which appears the attachment of an coupling 20 of the same principal construction as the coupling described above.

The outlet 20 has an opening member 131 which is pushed, at the activation of a lever arm 132, against the strip 110 and locally pushes it aside at a position opposite to the coupling 20. The strip brings back at either side of the opening member 131 and assures that the fluid can escape only over a limited area opposite the outlet.

In order to assure that the strip can spring as described, it is of outmost importance that the strip is sufficiently elastic and has sufficient springing properties which are not decreased at increasing age of the device. It is known that both rubber materials and artifical rubber-like materials, having a resiliency, have a tendency to loose said ability after being used a certain time, so called aging. At applications requiring high security, e.g. at gases where no leakages are tolerated, such as nitrous oxides, such aging properties must be counteracted.

Thus, according to the present invention, the elongated member 11 is a spiral spring 114 as mentioned above. The spiral spring is dimensioned so that a suitable biasing pressure against the slit 9 is obtained by means of a biasing member 113. The material in the sealing member 112 can be selected from its sealing properties while the elasticity is provided by the spring 114. However, the spring is used, according to the present invention, in an unconventional manner since its radial springing properties are used while a spiral spring, as known, normally is constructed for axial load.

It is normally desired to have a very low biasing force of the spring 114. Thus, according to the invention, the spring has inclined revolutions as appears more closely from FIG. 18. Then, the resistance against compression is determined by the torsion of the revolutions of the spring instead of the bending resistance as is the case in a straight spiral spring (as shown in FIG. 19). The revolutions of the spring are folded sidewards at a radial load. Thus it is avoided that the spring must be dimensioned too weak so that there is a risk that the spring is deformed at the manufacture and use.

By means of the spring there is obtained a smooth biasing of the sealing body 112 against the channel 9 so that the distance between the pushing position in which the opening member 131 pushes aside the strip and the position in which the strip 112 seals against the slit at either side of the coupling 20 can be maintained very short, which is a great advantage. Moreover, it is known that a spring of this type practically never looses its elastic properties (if it is not exposed to unnormal deformation).

The spring can eventually be enclosed in a hose and can be made from a suitable material such as spring steel without any restrictions if the fluid is corrosive. The material in the hose is selected so that it will resist possible corrosivity. The hose can be constructed directly on said spiral spring and be vulcanized to it. Alternatively, the spiral spring is inserted in the hose after the manufacturing thereof. The hose can also be crimped to the spring.

Figure 18:
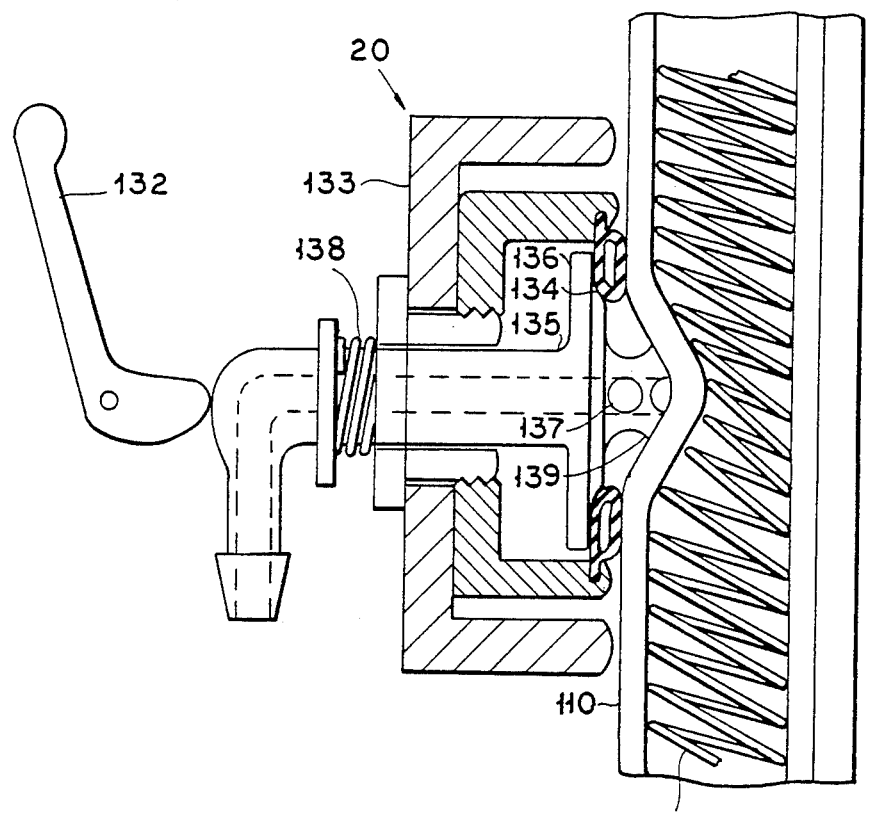
FIG. 18 is a longitudinal section through the rail according to FIG. 17.
Figure 19:
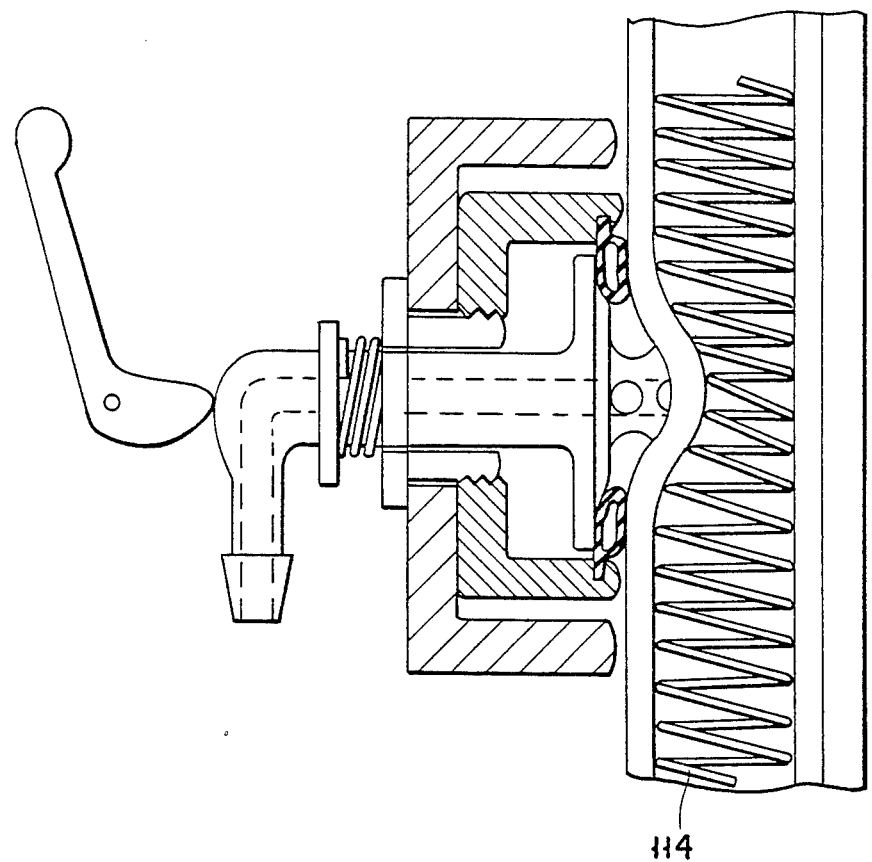
FIG. 19 is a longitudinal section corresponding to FIG. 18 of an alternative embodiment of the strip.

In FIG. 19 there is shown a cross-section corresponding to FIG. 18 having a straight spiral spring which can be used when a greater biasing force is desired.

FIGS. 17 and 18 shows the outlet in more details. The outlet comprises a vice to be hooked to the rail 1 at a manner previously known per se and similar to the parts described above. The rail is provided with a projecting edge 6 for this object. Furthermore, the coupling 20 comprises a box 133 surrounding an area of the slit having a predetermined size. The box comprises flexible sealing borders 134 around its rims. The sealing borders have normally a circular cross-section but are deformed to an oval cross-section at the hooking of the coupling for having a large abutment surface and thus achieving a good sealing.

Moreover, there are biasing members 131 comprising a tube 135 having an inner hole. The tube 135 comprises an enlargement 136 at the outer end thereof intended to cooperate with the above-mentioned sealing borders 134 for further improving the abutment and the sealing at the activation of the device.

There are also a lever arm 132, which moves the tube 135 from a desactivated extended position to the activated position shown in FIG. 18. In the activated position, the tip of the tube pushes the strip 110 so that it no longer seals against the slit 9 of the rail 1. Then, the fluid in the channels of the rail can escape to the space defined by the box 133 and through a cross-hole 137 in the outer end of the tube to the central hole of the tube and further to the user (not shown). As appears from FIG. 18, said pushing or activation takes place against the action of the spring 138. The outer end 139 of the tube is gently rounded to a sponge-like shape in order not to influence on or damage the sealing body 112. Due to the spiral spring 114, there is achieved a very short opening distance for the strip 110 which assures that the strip is not opened outside the box 133. The box 133 can thus be made comparatively small which means that the couplings can be placed closer to each other and more couplings can be included at one and the same rail.

Figure 20:
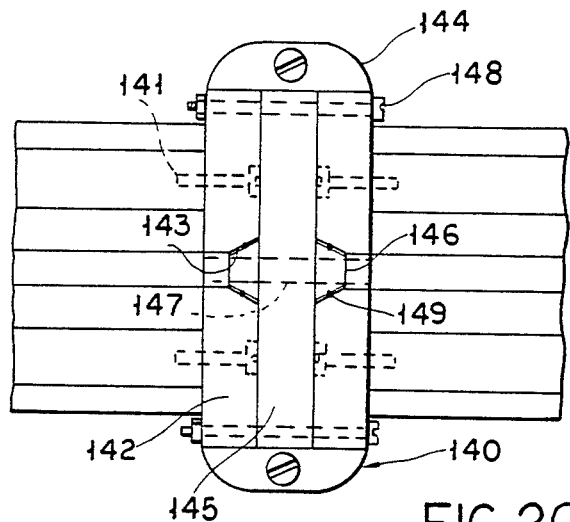
FIG. 20 is a plan view of a bridgement member according to the invention.

In FIG. 20 a lengthening member 140 is shown for interconnecting two rails. As appears from FIG. 16, the side part 10 of the channel is provided with notches 109 for screws. In said notches two screws 141 are inserted as shown in FIG. 20. By means of said screws, a connection member 142 is attached comprising a centrally positioned conical opening 143 opening to said channels in the rail. The lengthening member 140 comprises a plate 144 intended to be screwed to the wall or similar.

The lengthening member 140 comprises a central bridgement member 145 having projecting conical tips 146 intended to cooperate with said openings 143. Between the tips extending in opposite directions there is a bore 147 forming a connection between the two rails. The bridgement assembly is secured in the assembled position by two screws 148. O-rings 149 assure that there is no leakage.

Figure 21:
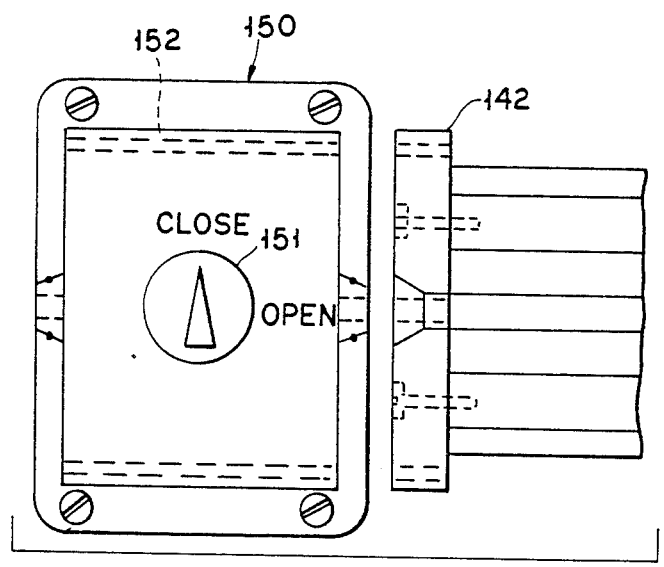
FIG. 21 is an exploded view of a blocking valve adapted at a bridgement between two rails.

Finally, FIG. 21 shows a valve 150 intended to be placed between two connection members 142 of two adjacent rails instead of the bridgement member 140. The valve 150 is connected to the rails in the same manner as described above for the bridgement member 145 but moreover comprises a shut-off valve of a type previously known per se. In the position shown, the valve is shut-off but can be put into the opened position by means of a hand lever 151. The valve is attached to the wall in a suitable way and comprises two through bores 152 for the screws 148.

Instead of the valve or at the same time, the bridgement member can also comprise a water separator, a pressure gauge etc.

Figure 22:
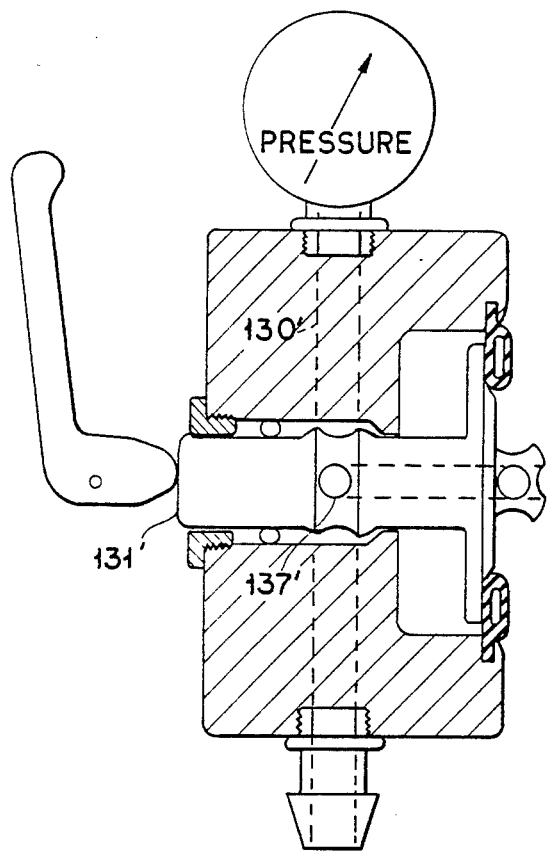
FIG. 22 is a cross-sectional view of an alternative embodiment of a coupling.

FIG. 22 shows an alternative embodiment of the vice in which the tube 131' is provided with a cross bore 137' opening to a cross bore 130' in the vice or coupling, to which bore a user or alternatively or at the same time a pressure gauge etc can be connected.

Hereinabove, the invention has been described in details with reference to preferred embodiments of the invention. The invention is naturally not restricted to said embodiments but can be modified in many respects within the scope of the invention.

For example, the sealing strip can, according to the invention, have many different shapes or forms such as attaching the sealing body 112 directly to the spiral spring. Moreover, the spiral spring, the sealing body and the biasing member can be made in a single piece and be inserted in the rail by compressing this integral sealing strip at the insertion in the rail. Said compression can be achieved e.g. by providing the spiral spring with a hose or similar according to that described above and connecting an under pressure inside the sealing strip so that it is compressed sufficiently for being inserted in the rail without being damaged. It is also possible to have said hose forming the sealing body 12 so that no special sealing body is needed for the sealing.

The invention is only limited by the patent claims below.

I claim:

1. A continuous output device for liquid or gaseous fluids, comprising:
   a rail (1) having at least one channel (10, 11) opening to a first surface (5) of the rail via a slit (9) sealed by a sealing strip (12) within said channel, a fluid being supplied to said channel; and a coupling (20) having an opening member (38) for locally pushing aside said sealing strip (12) for passing the fluid to said coupling beyond said sealing strip for further distribution to a using place, said sealing strip (12) using a spiral spring (114) covered with a sealing material (111, 112) for sealing against the slit.

2. A device as claimed in claim 1, wherein said coupling (20) comprises a cover (21, 39); wherein said coupling further includes a rubber sleeve (22) positioned in said cover to seal against a bottom of said rail adjacent to said slit; an engagement member (24) for engaging and locking said coupling to said rail; and an activation member (26) for moving said opening member (38) to cooperate with said sealing strip (12) for pushing it aside.

3. A device according to claim 2, wherein said engagement member (24) being a tube (135) having a gently rounded end (139), for cooperation with said sealing strip for locally pressing it aside for the output of fluid at the activation of a lever arm (132).

4. A device according to claim 1, wherein said rail comprises several parallel channels (41 to 46) for the different liquid or gaseous fluids.

5. A device according to claim 4, wherein at least two channels are accessed by a single coupling.

6. A device according to claim 1, wherein said spiral spring (114) has revolutions forming an acute angle with the longitudinal axis of the spring.

7. A device according to claim 6, wherein said sealing strip (111,112) fits loosely in a main part of said channel, said channel further comprising a side part for enclosing a biasing member (113), that biases, after insertion in the side part, said sealing strip (110) against said slit with a predetermined biasing force.

8. A device according to claim 1, further comprising a lengthening member (140) to connect two rails including a connection member (142) having a conical opening (143) and attached to each rail; and a bridgement member (145) provided with two conical tips (146) facing in opposite directions and interconnected by a boring (147) for cooperation with said conical openings (143) in two adjacent connection members positioned at either side of said bridgement member (145).

* * * * *